(12) United States Patent
Hollander

(10) Patent No.: US 6,697,088 B1
(45) Date of Patent: Feb. 24, 2004

(54) GRAPHICAL PRESENTATION SYSTEM

(75) Inventor: Gideon Hollander, Givat Chen (IL)

(73) Assignee: Jacada, Inc., Herzliya (IL)

( * ) Notice: Subject to any disclaimer, the term of this patent is extended or adjusted under 35 U.S.C. 154(b) by 0 days.

(21) Appl. No.: 09/067,274

(22) Filed: Apr. 27, 1998

(51) Int. Cl.$^7$ .............................................. G06F 15/16
(52) U.S. Cl. ..................................... 345/744; 345/762
(58) Field of Search ................................ 345/332, 333, 345/334, 348, 340, 349, 352, 759, 762, 765, 835, 781, 839, 810, 744

(56) References Cited

U.S. PATENT DOCUMENTS

| | | | | |
|---|---|---|---|---|
| 5,682,169 A | * | 10/1997 | Botterill et al. | 345/329 |
| 5,777,630 A | * | 7/1998 | Aaker et al. | 345/333 |
| 5,818,446 A | * | 10/1998 | Bertram et al. | 345/334 |
| 5,831,607 A | * | 11/1998 | Brooks | 345/333 |
| 5,968,119 A | * | 10/1999 | Stedman et al. | 345/333 |
| 6,008,811 A | * | 12/1999 | McMillan | 345/348 |
| 6,144,990 A | * | 11/2000 | Brandt et al. | 709/203 |

OTHER PUBLICATIONS

Screen Design Aid (SDA), section of the Application Development Tool Set/400 SC09–1768–00, 1994.
Microsoft Visual Basic Programer's Guide, 1995 edition.

* cited by examiner

Primary Examiner—Cao (Kevin) Nguyen
(74) Attorney, Agent, or Firm—Volentine Francos, PLLC (57) ABSTRACT

A presentation manager accepts standard commands or modified commands from legacy applications to provide text-based and graphic-based user interfaces. The presentation manager efficiently generates graphic-based displays for legacy applications by directly retrieving graphic definitions according to conventional host commands. The presentation manager provides standard host display protocol messaging for text-based clients (e.g., 3270 and 5250 terminals) and provides appropriate protocol messaging for other clients (e.g., graphical user interfaces and JAVA). Methods are provided for determining the protocol supported by a client.

35 Claims, 6 Drawing Sheets

GRAPHICAL PRESENTATION SYSTEM

FIELD OF THE INVENTION

The present invention relates to computer presentation applications and, more particularly, to a presentation development tool and run-time manager for providing character-based and graphic-based presentations for host and host-like applications.

BACKGROUND OF THE INVENTION

Conventional computer systems interact with computer users via displayed images on a computer monitor. For example, a typical application executed by the computer displays text at predefined areas on the monitor screen and enables a user to input text within the same or other areas.

Early generation applications use a relatively simple display mechanism. For example, text-based programs that operate with 3270 terminals display text and enable a user to enter text in fields defined on the computer screen. Data defining each screen (referred to herein simply as a "screen") is stored in a data memory. The host application issues a command (with associated data) to display a particular screen, identifying the screen by an identifier. An application reads the identifier, retrieves the corresponding screen and sends it to a terminal (e.g., a 3270 terminal). The terminal processes the screen and the associated data to display the screen and the data in a predefined format.

With the proliferation of personal computers, graphic-based user interfaces have become widely available. Programming languages such as VISUAL BASIC by MICROSOFT and POWERBUILDER by SYBASE enable a software developer to create custom graphical applications with relative ease.

In addition, programming languages such as JAVA have been developed that provide a very flexible operating environment. For example, a client executing on one computer can download any portion of an application from another computer (i.e., a server) as it is needed. This improves the efficiency with which an application may be developed and provided to the computer user.

The advantages provided by these and related developments have not been realized by many legacy applications that run on a host computer (e.g., a mainframe computer, an IBM AS/400 computer, a UNIX-based computer, a DEC VAX computer and the like). For simplicity, these applications will be referred to hereafter as host applications. A large number of host applications such as accounting and other database programs are based on software that was designed for the older data character-based displays.

Typically, the user of a system that uses these applications may not upgrade the system to use a newer graphical interface due to the relatively high cost and risks associated with upgrading the system. For example, it may take a long time and cost a significant amount of money to re-write the existing application to support the new features.

In addition, many users have a significant investment in the old software in terms of organizational know-how. For example, the user's software developers are familiar with the old software. It may take a long time and be relatively expensive, particularly in terms of lost productivity, to retrain these personnel.

Moreover, existing code typically is relatively stable. Thus, a user may be reluctant to switch to new, relatively unproven software. As a result of these issues, a significant number of character-based applications are still in use today.

One proposed solution to these problems involves the use of an intermediary program between the imbedded host application and the newer graphical presentation systems. An intermediary program provides the traditional interface to the host applications, i.e., it accepts screens and responds in the manner that the host applications expect. Thus, the host applications typically do not need to be modified. The intermediary program also provides an interface to the newer presentation programs. Again, the intermediary program performs the necessary operations to provide the presentation programs with the commands and data they expect and to receive commands and data from the presentation programs.

Despite these advances, conventional systems still have several shortcomings. For example, to use some conventional intermediary programs, the user must design the desired graphic-based presentation according to the character-based screens. Thus, the capabilities of the graphics in these systems may be limited in some respects to the capabilities of the character-based screens. Moreover, processing and development resources are wasted creating screens that are not presented to the user.

In addition, some organizations may chose to add the newer graphic-based systems to their current systems, rather than simple replacing their current systems. Thus, these organizations will need to support both the graphic-based and character-based formats. Conventional systems may not provide an efficient way to support both formats. For example, they may use a separate host application for each format.

Finally, as the architectures of the host and presentation applications evolve, there is a need for an efficient way to upgrade existing systems and create new host applications with new presentations (e.g., GUI) without making extensive changes in the existing host applications. In view of the above, a need exists for an improved presentation system for host applications.

SUMMARY OF THE INVENTION

A presentation development tool and run-time manager provides character-based and graphic-based presentations for host applications. The development tool enables a user to generate character-based and graphic-based presentations for the host applications. The run-time manager accepts conventional or modified presentation commands from a host application and presents a presentation in the appropriate format to a client. The client typically is a computer or a terminal and may support character-based or graphic-based presentations.

During run-time, graphic presentation definitions may be obtained directly from a database without using a screen definition. As a result, the system can provide graphic-based presentations more efficiently than conventional systems because the steps of generating and retrieving screens may be eliminated.

In one embodiment, the manager may automatically determine whether the client is text-based or graphic-based. For example, when a session is established with a client, the run-time manager identifies the client-type using a pre-defined table or some other method.

Thus, when a presentation is to be presented to that client, the manager can automatically provide the appropriate presentation type (e.g., character-based or graphic-based) to the client. Specifically, the manager retrieves the appropriate presentation definition (e.g., a screen or a window definition) from a database, processes the definition as necessary and provides the definition to the client.

Thus, the invention provides an improved presentation system for host applications. A user may program a presentation using JAVA and other advanced programming languages and invoke the presentation in the host application without using limiting intermediary processes. Accordingly, the invention brings the presentation level and the host application together in an efficient and logical manner.

BRIEF DESCRIPTION OF THE DRAWINGS

These and other features of the invention will become apparent from the following description and claims, when taken with the accompanying drawings, wherein similar references characters refer to similar elements throughout and in which:

DESCRIPTION OF EXEMPLARY EMBODIMENTS

Figure 1:
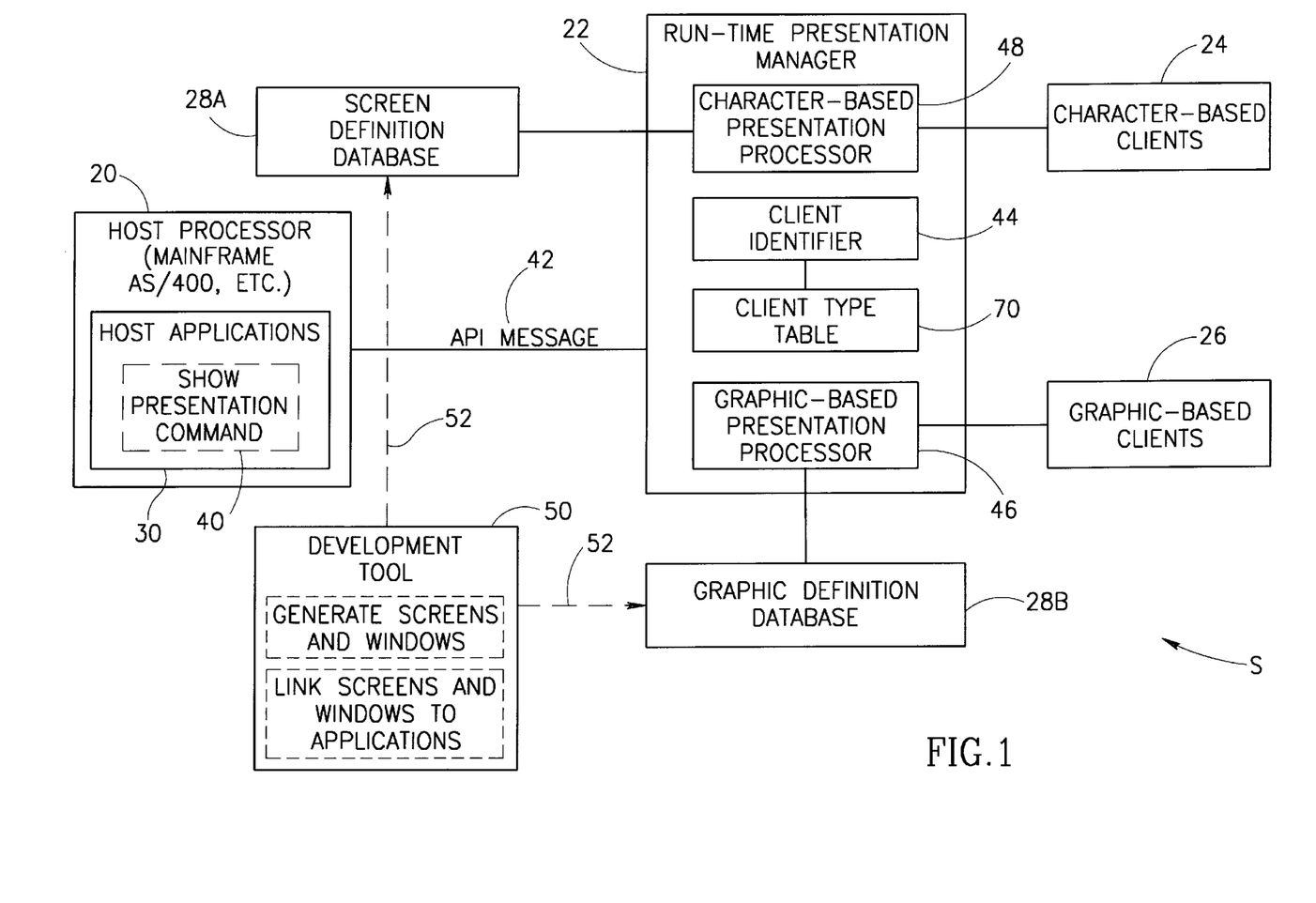
FIG. 1 is a block diagram of one embodiment of a computer system incorporating a presentation manager constructed according to the invention.

In FIG. 1, a computer system S includes a host processor 20, a run-time presentation manager 22 and several clients 24 and 26. Host applications 30 running on the host processor 20 generate data that is to be displayed by the clients 24 and 26 as part of a graphic-based or character-based presentation. The presentation manager 22 integrates the data from the host applications 30 with graphic-based or character-based definitions that are stored in databases 28 to provide the appropriate presentation information to the clients 24 and 26.

In accordance with the invention, the graphic-based presentations may be directly developed for and associated with the host applications 30. Thus, in contrast with conventional systems, the graphic-based definitions may be generated and retrieved without any dependence on character-based definitions (e.g., screens).

In addition, the presentation manager 22 in the system of FIG. 1 supports both graphic-based clients 26 and character-based clients 24 in a relatively transparent manner. To further an understanding of these operations, the graphic-based and character-based presentations and definitions mentioned above will be discussed briefly before the details of the components of FIG. 1 are explained.

The operations of host applications may be defined in several layers. One layer, the database layer, is generally associated with handling stored data. Another layer, the logic layer, is generally associated with processing the data. Interactive or on-line applications are defined on yet another layer, called the presentation layer, that is associated with presenting the data to, for example, a user.

A variety of presentation formats may be supported by the presentation layer. Some clients may be computers that support graphic-based presentations. For example, a window-based client displays a presentation using windows containing various icons, text or data fields or other graphical entities. To present the data processed by the application to the user, the data is associated with one or more of the graphical entities in the window.

Other clients may by 3270 or 5250 terminals that support character-based presentations. A 3270 or 5250 terminal displays a screen. This screen consists of one or more fields located throughout the screen. In a similar manner as above, these fields are associated with the application data to display the data and/or allow data to be entered into the fields.

In the embodiment of FIG. 1, digital representations of these screens and windows are stored in the databases 28. A graphic definition database 28B contains definitions of windows that are displayed by the graphic-based clients 26. A screen definition database 28A contains definitions of 3270 or 5250 screens that are displayed by the character-based clients 24. As discussed below, many other presentation and definition formats may be used in practicing the invention.

Referring again to the host applications 30 and the presentation manager 22, the operations involved in supplying the appropriate definitions to the clients 24 and 26 will now be discussed. A host application 30 initiates a presentation by executing a command referred to in FIG. 1 as show presentation 40. In response to the show presentation command 40, a message 42 is sent to the presentation manager 22. This message is part of the presentation manager application program interface ("API") that defines the messages that the host processor 20 and the presentation manager 22 use to communicate with one another. The message 42 includes an identifier that identifies a specific screen (e.g., a 3270 screen) or a specific graphical display (e.g., a window) associated with a particular presentation. The message 42 also includes the data associated with the screen or display.

Upon receipt of the message 42, the presentation manager 22 provides the appropriate presentation definition and the corresponding data to a client 24 or 26. The presentation manager 22 retrieves the appropriate definition from the databases 28 based on the client type and the screen or window identifier. The client type is generated by a client identifier 44 that determines whether the client is graphic-based or character-based.

When the client is graphic-based, a graphic-based presentation processor 46 uses the identifier to retrieve a graphic definition from the graphic definition database 28B. The graphic-based presentation processor 46 merges the data from the message 42 with the definition and sends it to the graphic-based client 26.

When the client is character-based, a character-based presentation processor 48 uses the identifier to retrieve a screen definition from the screen definition database 28A. The character-based presentation processor 48 merges the data from the message 42 with the definition and sends it to the character-based client 24.

A client 24 or 26 processes the data from the presentation manager 22 as necessary to display the presentation. The presentation thus includes the designated screen or window (or other presentation) with the data formatted as necessary and displayed in the appropriate fields, etc.

FIG. 1 also illustrates a development tool 50 that generates the graphic-based and character-based presentation definitions stored in the databases 28. The development tool 50 enables a user to design the layout of the presentation and associate that layout with the data processed by a host application 30. In a trivial example, a parameter such the name of a person may be associated with (and hence displayed in) a specific field in the presentation. As indicated by the dashed lines 52, the development tool 50 loads the databases 28 with the definitions some time before the definitions are retrieved during run-time.

Figure 2:
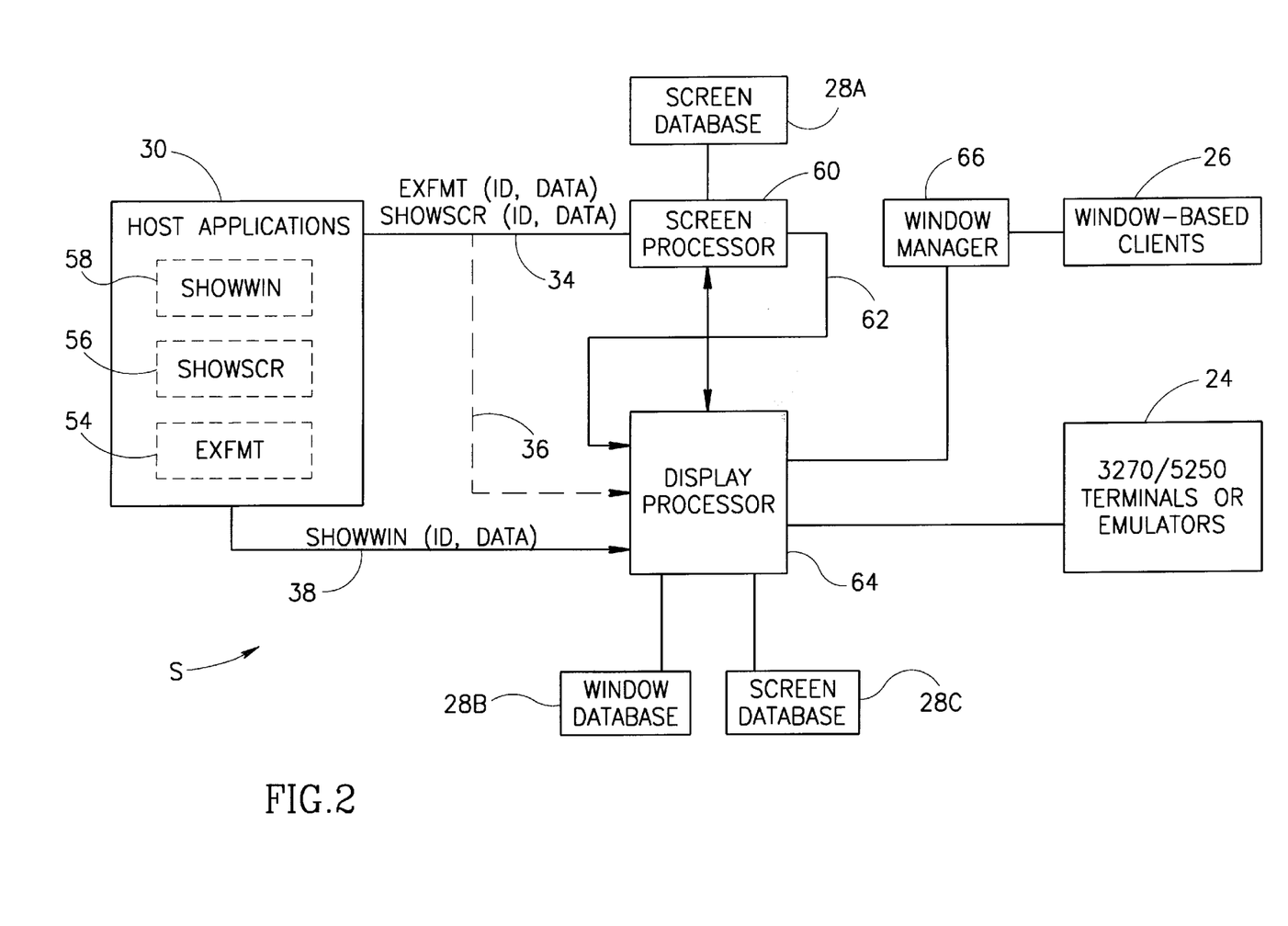
FIG. 2 is a block diagram of another embodiment of a computer system incorporating a presentation manager constructed according to the invention.

Referring now to FIG. 2, one embodiment of a system S constructed according to the invention that supports both window-based clients 26 and screen-based (3270 or 5250) clients 24 is shown. The embodiment of FIG. 2 also illustrates a configuration that supports applications 30 that use graphic-based requests (e.g., SHOWWIN 58) according to the invention and/or conventional character-based requests (e.g., EXFMT 54).

The host applications in FIG. 2 illustrate specific examples of the show presentation commands referred to in FIG. 1. Different commands may be used depending on the particular application. For example, RPG programs may use an Execute Format (EXFMT) command 54. COBOL programs may use a Show Screen (SHOWSCR) command 56.

The system of FIG. 2 also supports applications 30 that use non-conventional commands such as the Show Window (SHOWWIN) command 58. The Show Window command 58 may be used to provide window-based and screen-based presentations. In particular, in accordance with the invention, windows may be developed specifically for this command using the development tool 50 illustrated in FIG. 1. Thus, the window presentations are designed directly for the host application 30, without any dependence on a screen. In addition, as discussed below, the systems uses the identifier associated with the SHOWWIN command to directly retrieve the window definitions from the window database 28B, again, without the use of an intermediary screen data.

The conventional and non-conventional commands include identifiers and associated data as discussed in conjunction with FIG. 1. In addition, the host processor (not shown) generates API messages in response to these show presentation commands in a similar manner as discussed above.

According to the invention, conventional commands such as SHOWSCR 56 and EXFMT 54 may be used to initiate either screen-based or window-based presentations. In one embodiment, character-based messages (e.g., EXFMT and SHOWSCR) are sent to a screen processor 60 via a line 34. Typically, the screen processor 60 is part of the host operating system. The screen processor 60 uses the screen identifier to retrieve a screen from a screen database 28A. Then, the screen processor 60 merges the screen with the data from the message.

The screen processor 60 sends the resulting 5250 or 3270 data stream to a display processor 64 via a line 62. When the client is screen-based (e.g., a 3270 or 5250 based terminal or terminal emulator 24), the display processor 64 sends the data stream to that client 24.

When the client is window-based, the display processor 64 interprets the data stream to determine with which screen the data stream is associated. In addition, the display processor 64 extracts the data from the data stream. Data stream interpreting and extracting techniques are known in the art. Accordingly, the details of these techniques will not be treated in detail here.

After identifying the screen, the display processor 64 determines which window is associated with that screen. The display processor 64 retrieves this window from the window database 28B, merges it with the extracted data and sends it to a window manager 66. The window manager 66 processes the merged window definition and data and presents it to the client 26.

In another embodiment, the conventional messages (e.g., in response to EXFMT and SHOWSCR commands) are sent directly to the display processor 64 via a line 36. As discussed in detail below, the display processor 64 determines whether the client is screen-based or window-based. When the client is window-based, the display processor 64 associates the screen identifier with a window definition and retrieves the corresponding window definition from the window database 28B. The display processor 64 merges this definition with the data from the message and sends it to the window manager 66. The window manager 66 processes the merged window definition and data as discussed above.

When the client is screen-based, the display processor 64 uses the screen identifier to retrieve a screen from a screen database. The display processor may obtain the screen definition directly from a screen database 28C or it may cooperate with the screen processor 60 to obtain the screen definition from the screen database 28A. After the display processor 64 retrieves the screen definition, the display processor 64 processes the definition and sends it to the client 24 as discussed above.

The SHOWWIN messages are sent to the display processor 64 via a line 38. For a window-based client 26, the display processor 64 uses the window identifier to retrieve a window definition from the window database 28B. This definition is sent to the client 26 as discussed above. For a screen-based client 24, the display processor 64 maps the window identifier to a screen and retrieves the corresponding screen definition from a database 28A or 28C as discussed above. The retrieved definition is then processed as previously discussed.

Figure 3A:
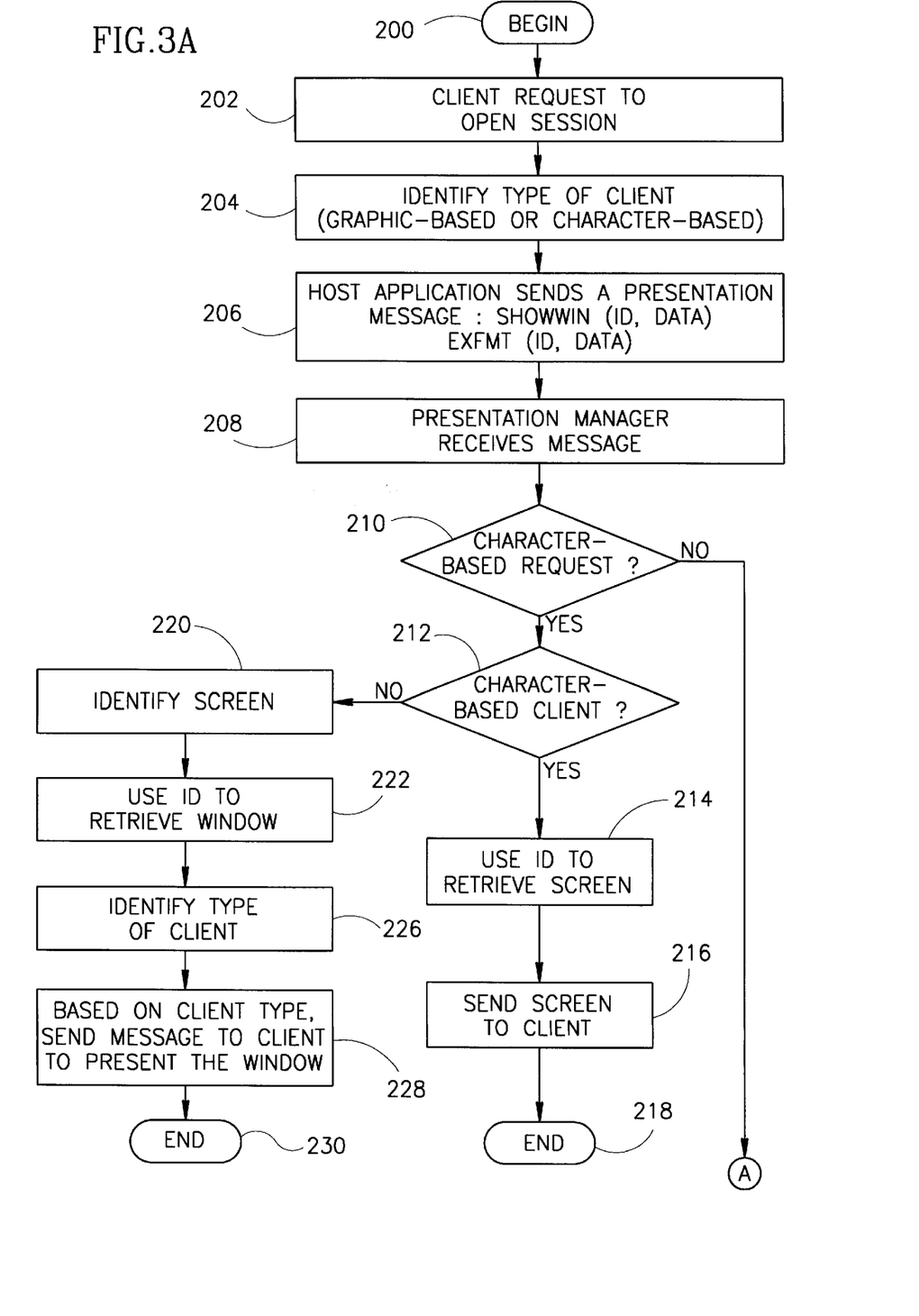
FIGS. 3A and 3B are flowcharts illustrating presentation operations that may be performed according to the invention.
Figure 3B:
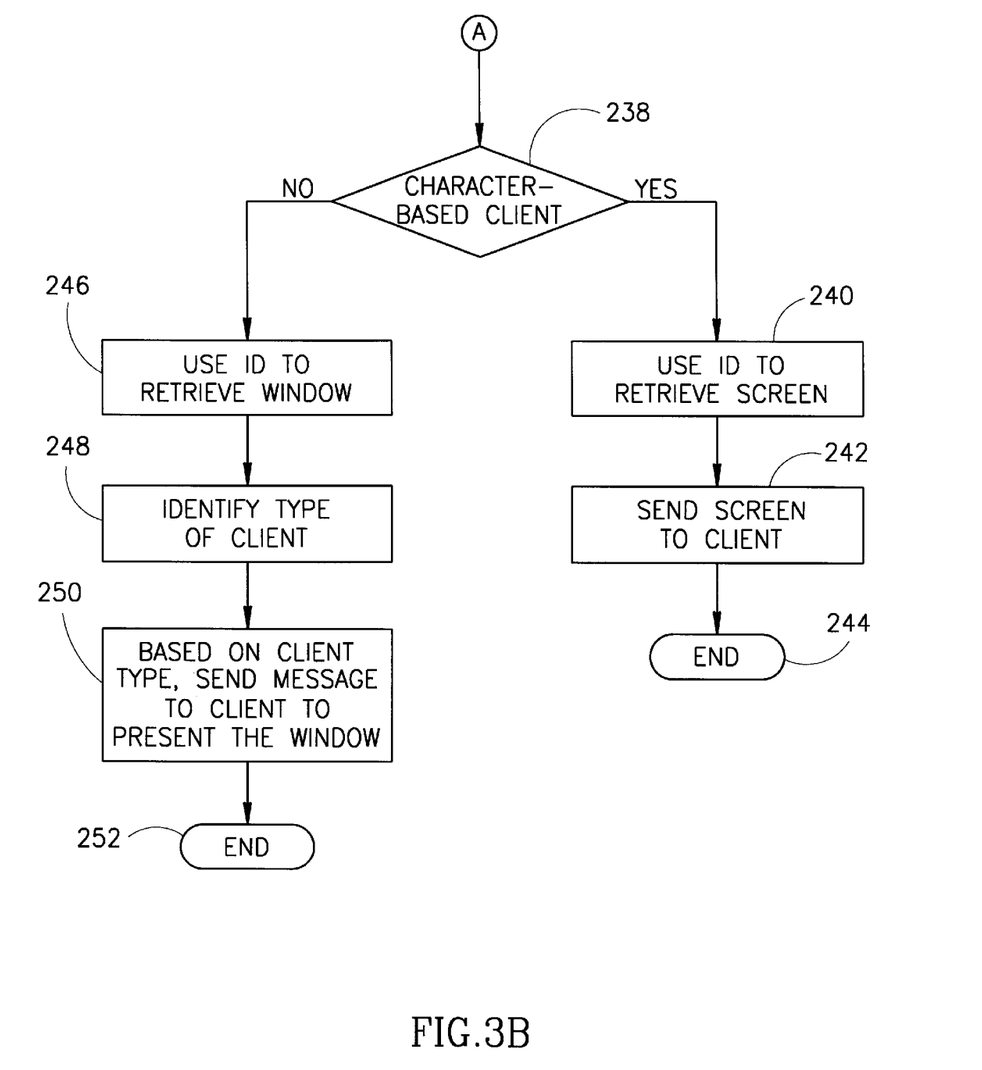

With the above description in mind, FIGS. 3A and 3B describe an exemplary presentation process according to the invention. Beginning at block 200, the process describes operations performed to provide one presentation during a session invoked by a client.

At block 202, the client 24 or 26 sends a request to open a session. In simple terms, this establishes a communication path between the client 24 or 26 and one or more applications 30. This operation is discussed in more detail below in conjunction with FIG. 5.

After the session is established, the client identifier 44 (FIG. 1) identifies the client type (character-based or graphic-based) at block 204. In another embodiment this step may be performed later in the process such as after block 208 described below.

In one embodiment, the client identifier 44 automatically determines the client-type of the clients 24 and 26. For example, a client type table 70 (FIG. 1) contains a mapping of each client 24 or 26 to a type (e.g., character-based or graphic-based). This table 70 may be set up by a system administrator when the client 24 or 26 is added to the system. Alternatively, the client identifier 44 may identify the client type by analyzing messages or responses from the client 24 or 26. In addition, some clients 24 or 26 may support a client identifier handshake procedure whereby the clients 24 or 26 cooperate with the presentation manager 22 to log the client type.

At block 206, a host application 30 associated with the session initiates the presentation by executing a show presentation command 40 (e.g., the SHOWWIN 58 or EXFMT 54 commands shown in FIG. 1). In response to this command, an API message 42 is sent to the presentation manager 22. Typically, the API message 42 includes a parameter (e.g., a screen ID) that identifies a particular screen or a parameter (e.g., a window ID) that identifier a particular graphical display along with the data associated with the screen or display.

At block 208, the presentation manager 22 receives the API message 42. Initially, the presentation manager 22 determines whether the message 42 is a character-based request such as EXFMT or a graphic-based request such as SHOWWIN (block 210).

If the request is character-based, the process proceeds to block 212 where the presentation manager 22 uses the client type obtained at block 204 to determine whether the client is character-based. If the client is character-based, the screen associated with the identifier (e.g., a screen identifier) is retrieved from the screen database 28A at block 214. The screen and associated data is then sent to the client 24 as discussed above (block 216) and this aspect of the presentation ends (block 218).

If at block 212 the client is graphic-based, the process proceeds to block 220 where the presentation manager 22 identifies the screen associated with the request. As discussed above in conjunction with FIG. 2, this may involve simply retrieving the identifier from the request or it may involve interpreting the data stream (e.g., the 3270 or 5250 data stream).

At block 222, the presentation manager 22 determines whether the screen has a window representation. If so, the window associated with the identifier is retrieved from the window database 28B. If the screen does not have a window representation, a default window for this screen is retrieved from the window database 28B.

Next, at block 226, the client identifier 44 identities the graphical presentation type (e.g., JAVA, VISUAL BASIC, etc.) of the client 26. This may be determined in a similar manner as discussed above for the client type. Based on this graphical presentation type, the presentation manager 22 processes the window retrieved from the database 28B to provide the presentation to the client in the proper format (block 228). This aspect of the presentation then ends at block 230.

Returning to the decision block 210 above, if the message 42 is a graphic-based request the process proceeds to block 238 where the presentation manager 22 uses the client type obtained at block 204 to determine whether the client is character-based. If the client is character-based, an identifier (e.g., a screen identifier associated with the received window identifier) is used to retrieve a screen from the screen database 28A at block 240. The screen and its associated data is then sent to the client 24 as discussed above (block 242) and this aspect of the presentation ends (block 244).

If at block 238 the client is graphic-based, the process proceeds to block 246 where the window definition identified by the window identifier is retrieved from the window database 28B. Next, at block 248, the client identifier 44 identifies the graphical presentation type (e.g., JAVA, VISUAL BASIC, etc.) of the client 26. At block 250, the presentation is sent to the client 26 in the proper format according to the graphical presentation type. This aspect of the presentation then ends at block 252.

Figure 4:
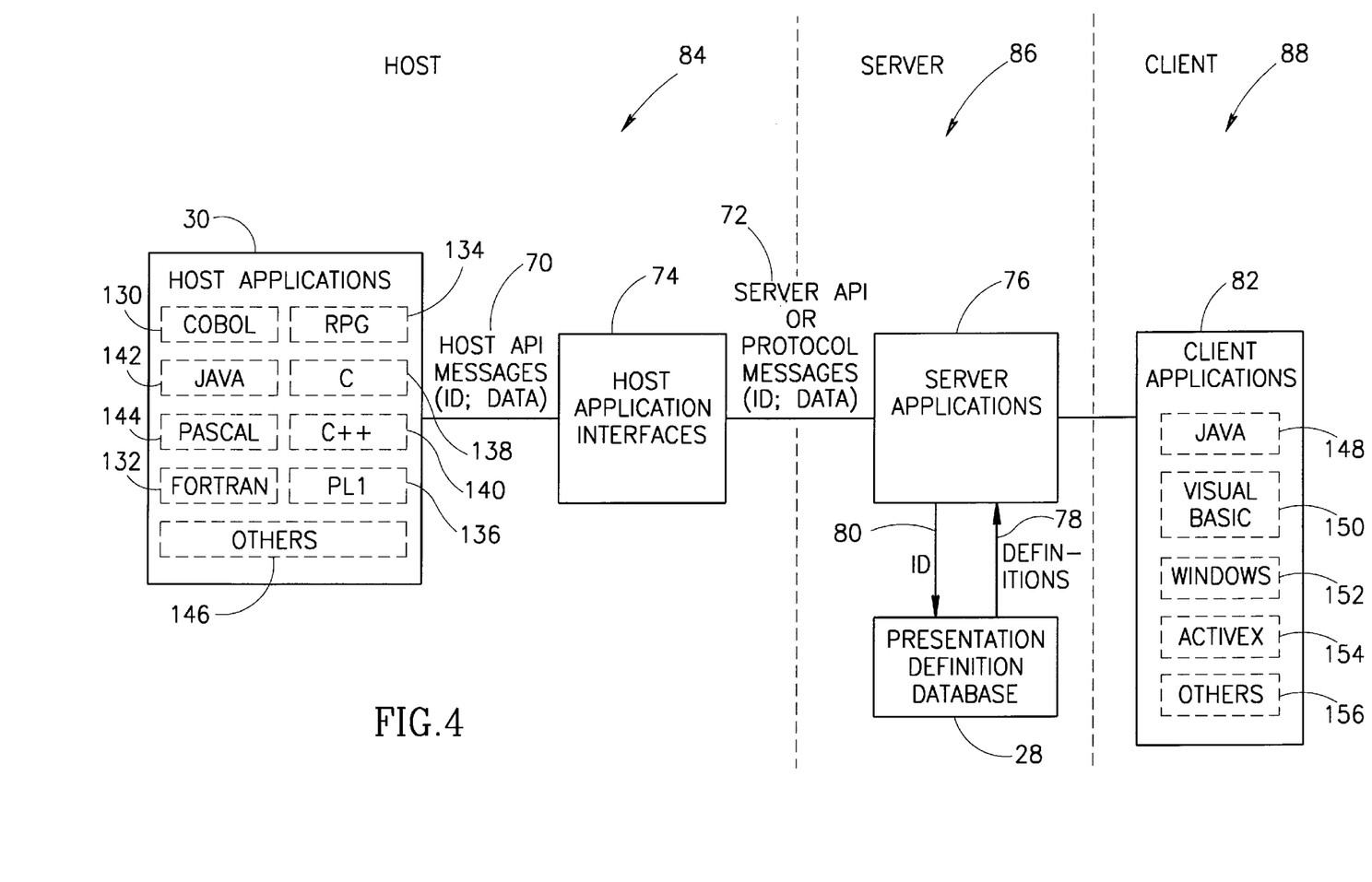
FIG. 4 is a block diagram of another embodiment of a computer system constructed according to the invention that illustrates exemplary processing distribution and application interface messaging.

The components and processes described above may be implemented using a variety of processing architectures. For example, FIG. 4 illustrates logical entities (host 84, server 86 and client 88) and interfaces between the entities in one embodiment of the invention. This architecture has the advantage that different components of the system may be implemented on different machines to increase the efficiency of the system. For example, some machines may perform some of the operations associated with the logical entities more efficiently than other machines perform these operations. Thus, the components are defined as logical entities rather than being tied to specific hardware devices so that they may be readily adapted to two-tier, three-tier or other architectures as needed.

To enable the distribution of functionality as depicted in FIG. 4, the invention uses host API messages 70 and server API or protocol messages 72 to send presentation requests between the applications. The host applications 30 communicate with host application interfaces 74 via the messages 70. As discussed above, a message 70 is generated in response to show presentation command such as EXFMT or SHOWWIN. The message 70 includes a screen or window identifier and associated data.

The host application interfaces 74 process the messages 70 and relay them to server applications 76. As depicted in FIG. 4, the host application interfaces 74 communicate with the server application 76 using messages 72. In general, both the server API messages 72 and the server protocol messages 72 include the screen or window identifier and associated data that were passed from the host application.

As discussed above, the server application 76 retrieves graphic or screen definitions 78 from a presentation definition database 28 according to the identifier 80 contained in the message 72. The server processes these definitions to provide them to client applications 82.

The server API message 72 may be used when the host and server applications reside on the same computer (i.e., when the server application 76 resides on the host computer). In other embodiments where the server application 76 resides on the host computer, some of the functions of the host application interface 74 and the server application 76 may be combined. This may eliminate the need for separate host and server API messages.

The server protocol message 72 may be used when the two applications do not reside on the same computer. This would be the case in a typical three-tier architecture where the client applications 82 are resident on a user's personal computer, the server applications 76 reside on a server, and the host application interfaces 74 are on the host computer. The protocol may also be used in embodiments where the server components (e.g., applications 76 and database 28) reside on the same computer as the client application 82.

Figure 5:
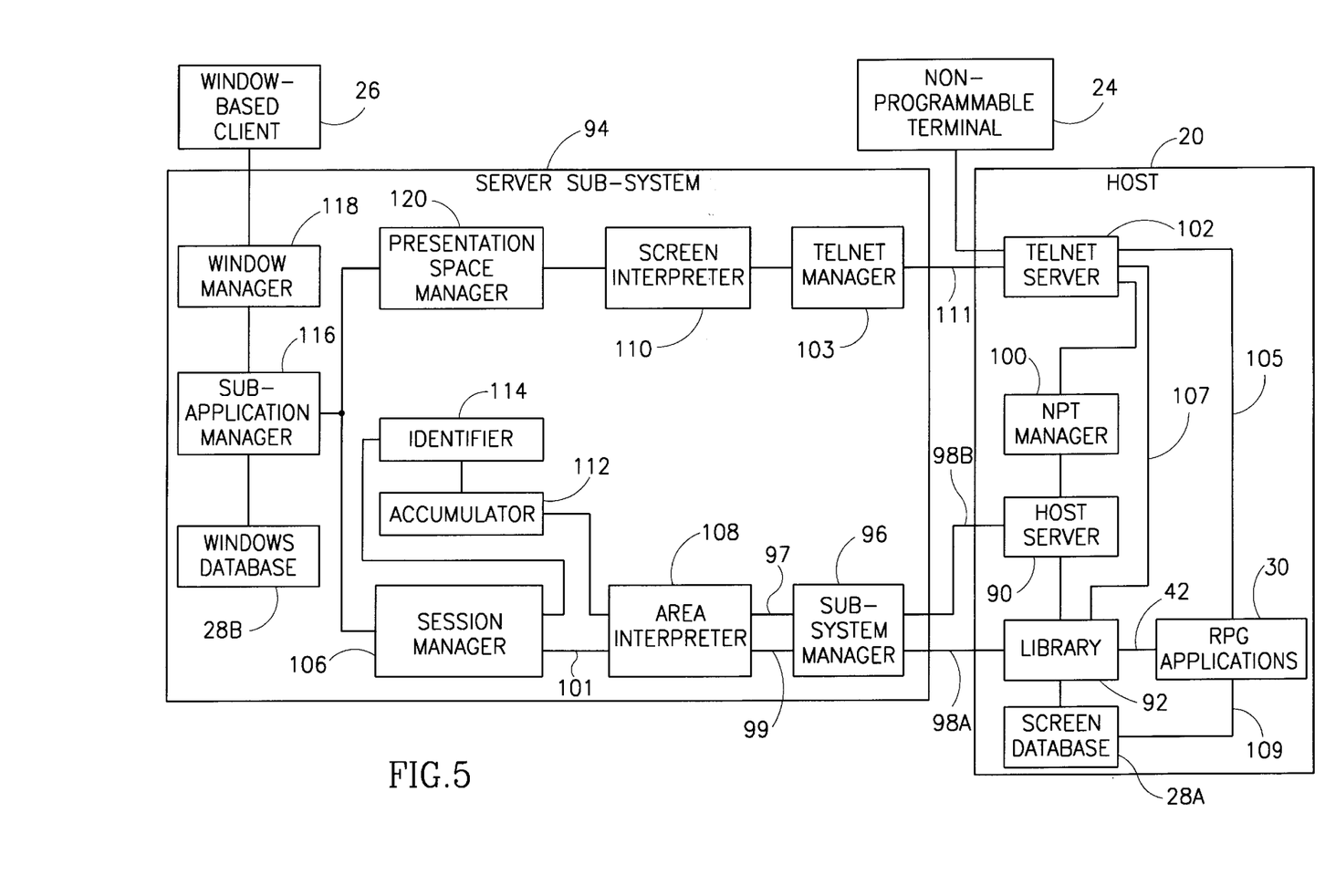
FIG. 5 is a block diagram of another embodiment of a computer system incorporating a presentation manager constructed according to the invention that illustrates an exemplary client/server configuration.

Referring now to FIG. 5, one embodiment of a system incorporating the teachings of the invention discussed above is shown. This embodiment integrates a three-tier architecture for supporting window-based clients with host-based components that support conventional character-based terminals. Such a system may be used by customers who wish to migrate over time from a system that supports character-based clients to a system that supports graphic-based clients.

In FIG. 5, RPG applications 30 running on a host 20 initiate the presentations that are displayed on non-programmable terminals 24(screen-based clients) and window-based clients 26. For the window-based clients 26, a server sub-system 94 interfaces with the clients 26 and the host 20 to provide the window presentations.

In a similar manner as discussed above in conjunction with FIGS. 2, 3A and 3B, the system of FIG. 5 may initiate each of the two types of presentations in one of two ways. A presentation on a non-programmable terminal ("NPT") 24 may be initiated by either a character-based command (e.g., a standard RPG EXFMT command) or by a graphic-based command (e.g., a SHOWWIN command). Similarly, a presentation on a window-based client may be initiated by either a character-based command (e.g., a standard RPG EXFMT command) or by a graphic-based command (e.g., a SHOWWIN command). Each of these four scenarios are discussed below.

Before discussing these four scenarios, the procedure for initializing the system will be treated briefly. A client interacts with a host application 30 by establishing what is known as a session. Establishing the session involves invoking an instance of a host application 30 and any associated libraries on the host. A library 92 is a dynamically loadable module on the host machine 20 that is linked with the code of a host application 30 and provides presentation services to the application 30. The establishment of the session also involves setting up various communication parameters between the client and the host application 30 and the library 92.

The system includes a host server 90 (a server process running on the host machine 20) that listens for requests from the clients to initiate and terminate applications. The host server 90 may handle requests that originate from window-based clients 26 or NPTs 24.

A window-based client 26 initiates a session through the server sub-system 94. The server sub-system 94 is a collection of software modules which typically resides on a server machine. One module, a sub-system manager 96, establishes several TCP/IP socket-based connections 98 between the host 20 and the server sub-system 94.

To initialize a session, the server sub-system 94 sends an Initialize Application message to the host server 90 via the connection 98B. In response to this message, the host server 90 initiates an application (e.g., RPG application 30) on the host 20.

After the socket connections are established with the server sub-system 94, the library 92 sends a Session Started message to the server sub-system 94. This message includes, for example, information that identifies the socket to be used during the session. After the server sub-system 94 processes the Session Started message, the server sub-system 94 sends an Initialize Session message to the library 92. This message includes, for example, connection parameters, language/translation schemes and GUI capabilities of the connecting client.

An NPT manager 100 handles the initialization procedure for the NPT-based clients 24. On the NPT side of the NPT manager 100, this procedure is similar to the procedure used in conventional NPT-based systems. The NPT manager 100 communicates with the NPT via a Telnet server 102. The Telnet server 102 listens for 3270/5250 presentation requests and provides the communication interface between the host 20 and the NPT 24.

In addition to the above, the NPT manager 100 provides a packet-based interface for the host server 90. The NPT manager 100 transmits and receives messages that are similar to those transmitted and received by the sub-system manager 96. Thus, the session initialization operations on the host-end are similar to those discussed above.

Once the session is established and the application 30 is running, the application 30 will execute a command that initiates a presentation. As discussed above, a presentation may be provided using one of four scenarios. The first scenario will now be described.

As discussed above, graphical presentations may be designed directly for graphic-based clients. These presentations may be initiated by invoking an application that includes non-conventional graphic-based commands. An existing application may be modified to call a non-conventional command using, for example, a code-parser utility. The execution of a non-conventional command initiates one or more API calls.

In the embodiment of FIG. 5, one of these API calls is named Send Window. The Send Window call is used to request the display of a window and is analogous to the SHOWWIN command discussed above. Thus, the information sent in a Send Window call includes a window identifier and the data that will be displayed in the window.

Some conventional applications provide presentations that consist of several records where each record contains the information for a portion of the presentation. In this case, a series of calls may be used to provide a presentation—each call being associated with a particular record.

To support these types of applications, an API call referred to as Send Record is supported by the library 92. Each Send Record call initiates the display of a record. The data sent in a Send Record call includes the information that identifies the record and the data that will be displayed in the record. After all of the records have been sent, another API call, named Flush, is used to cause all of the pending records (i.e., the records that were sent but not yet displayed) to be presented on the client's display.

In response to an API call, the library 92 sends the identifier and data associated with the presentation request to the sub-system manager 96 by sending a protocol message over the TCP/IP connection 98A. The sub-system manager 96, in turn, passes the identifier and data for the windows (logical line 99) and the records (logical line 97) to an area interpreter 108.

If a screen or window has one or more dynamic areas (i.e., areas in the screen or window that may change from one call to the next), an area interpreter 108 may process the data to accommodate the characteristics of the dynamic area. For example, the area interpreter 108 may decompose the dynamic area on the screen or window to determine the characteristics of the dynamic area. Various methods of decomposition are known in the art. Accordingly, these details of these methods will not be treated here.

The area interpreter 108 sends windows to a session manager 106 over a line 101. The operation of the session manager 106 is discussed below.

The area interpreter 108 sends records to an accumulator 112. The accumulator 112 stalls the requests to display the records until it receives a Flush request. The assembled records are then sent to an identifier 114 that identifies the GUI presentation that is associated with the particular set of records that has been sent. This information is then sent to the session manager 106.

The session manager 106 stores the information for records or windows on a session-by-session basis. The stored data may be categorized by session ID, by record ID, by field name and by offsets within the fields. When a display is to be presented, the session manager 106 responds to queries from a sub-application manager 116 (discussed below) to provide the record or window information.

The sub-application manager 116 builds the display that is to be presented to the client 26. The sub-application manager 116 queries the session manager 106 to obtain the screen or window identifiers and to determine where the associated variable data is stored in the session manager 106. The sub-application manager 116 uses this information to retrieve the appropriate window definition from the window database 28B and to incorporate the data into the window.

The sub-application manager 116 treats the window or records for each session as a separate sub-application. By storing the information in the session manager 106 on a per session basis, windows or records from different host applications can be combined into a single presentation, if desired.

The sub-application manager 116 sends the resulting window to a window manager 118. The window manager 118, in turn, processes the data as necessary to provide it to the client 26.

In the second scenario, a conventional character-based command (e.g., the EXFMT command discussed above) may be used to initiate a presentation on a window-based client 26. In this case, the system displays a window in response to the request to display a 5250 or 3270 screen.

As discussed above, the data sent by the EXFMT call includes a screen ID that identifies a 5250 or 3270 screen and the data that will be displayed in the screen. In response to this command, a display manager (not shown) retrieves the appropriate screen from a screen database 28A as discussed above in conjunction with FIGS. 1, 2, 3A and 3B. The display manager sends the 5250/3270 data screen to the Telnet server 102.

The Telnet server 102 sends this information over a TCP/IP connection 111 to a Telnet manager 103 that provides the 3270/5250 communications interface for the server sub-system 94. The screen interpreter 110 decomposes the data stream using KnowledgeBase rules to identify the screen (by its structure) and extract the data from it. The screen interpreter 110 then identifies the window that is associated with the screen. In the event the screen interpreter 110 cannot identify the screen, a default window may be used. The window ID and the extracted data are sent to a presentation space manager 120. The presentation space manager 120 responds to queries (e.g., based on screen ID and field) from the sub-application manager 116 in a similar manner as discussed above for the session manager 106. If desired, the presentation space manager 120 may manage several Telnet sessions to enable a client to request presentations from different host sessions. In a similar manner as discussed above, the presentation manager builds the display to present the window to the client 26.

The next two scenarios deal with the situation where a presentation is provided to a screen-based client 24. When the host application 30 executes a character-based request (e.g., EXFMT), a display manager (not shown; this is typically part of the host operating system) uses the associated ID to retrieve the 3270/5250 data screen from the screen database 28A via line 109. The display manager then incorporates the data into the screen and sends the data screen to the Telnet server as represented by a line 105. The Telnet server 102, in turn, sends the data screen to the NPT 24. These operations are similar to the operations performed by conventional mainframe and AS/400 systems. Accordingly, the details of these operations will not be treated in more detail here.

In the fourth scenario, when the host application 30 executes a graphic-based request (e.g., Send Window), the display manager maps the window identifier to a screen and retrieves the corresponding 3270/5250 data screen from the screen database 28A. The display manager then incorporates the data into the screen, causes the data screen to be sent to the Telnet server as represented by a line 107, after which the Telnet server 102 sends the data screen to the NPT 24.

From the above, it may be seen that for applications that use the windows definitions developed according to the invention as discussed above, the time consuming steps associated with interpreting screens and handling records are eliminated. Thus, it will be appreciated that this method may provide a less complicated and more efficient method for generating presentations.

Referring again to FIG. 1, the general operation of the development tool 50 will be treated in more detail. A user uses the tool 50 to generate the physical layout of a window or a screen. This may involve defining the elements within the window or screen. It may involve defining the size and location of these elements. Or it may involve associating data with these elements, including defining the data type and whether the data is to be displayed to the user and/or input by the user.

These operations are similar to the operations performed by other display development tools. See, for example, the "Screen Design Aid (SDA)" section of the "Application Development ToolSet/400 SC09-1768-00," the contents of which is hereby incorporated herein by reference, for a 3270/5250 screen design tool. In addition, various methods are known for creating windows. See, for example, the "Microsoft® Visual Basic® Programmer's Guide" 1995 edition, the contents of which is hereby incorporated herein by reference. Windows may also be defined using JAVA or a variety of other programming tools.

After the screen or window is designed it is linked to the application 30. This includes associating the variables with those of the show presentation command 40 (e.g., SHOWWIN), assigning an identifier, and storing the definition in a database 28.

As would be appreciated by one skilled in the art, the invention may be implemented in a variety of configurations and using many different types of components. As shown in FIG. 1, the host processor 20 may be an AS/400 computer sold by IBM or it may be a mainframe computer. Alternatively, the host processor 20 may be a VAX computer sold by DIGITAL EQUIPMENT CORP., a UNIX-based computer of any other host-like computer.

In addition, as FIG. 4 illustrates, the teachings of the invention may be implemented with host applications 30 created using many different programming languages. The selection of a particular programming language depends on many factors including the expertise of the user's programmers and the hardware owned by the user. Typically, COBOL 130 and FORTRAN 132 programs would be used on a mainframe computer. RPG 134 and PL1 136 may be used on an AS/400. C 138 and C++ 140 may be used, for example, on UNIX and VAX machines. In practice, however, any of the above programs including JAVA 142, PASCAL 144 and others 146 could be implemented on a variety of host hardware.

Also as shown in FIG. 4, a variety of clients 82 may be supported in practicing the invention. For example, typical graphical presentation clients may be based on JAVA 148, MICROSOFT VISUAL BASIC 150, MICROSOFT WINDOWS 152, ACTIVEX 154 or other clients 156. The operation and configuration of a client 82 will depend on the applications desired by the user. The basic implementations for these clients 82 are known in the art. Accordingly, these aspects of the embodiment of FIG. 4 are not treated in detail.

From the above, it may be seen that the invention brings the client code (e.g., 4GL, JAVA, etc.) and host COBOL/RPG programming paradigms closer together. This allows users to develop the database and logic layers as they have done in the past (e.g., using COBOL) and to develop the presentation layer using modern graphic-based tools. While certain specific embodiments of the invention are disclosed as typical, the invention is not limited to these particular forms, but rather is applicable broadly to all such variations as fall within the scope of the appended claims. To those skilled in the art to which the invention pertains many modifications and adaptations will occur. For example, various methods of formatting data to provide a presentation may be used in practicing the invention. A number of methods may be used to determine the client type or to perform other client identifying operations. Similarly, various messaging techniques may be employed for sending application interface-type information between entities. Also, the invention may be practiced with a variety of applications executed by a host, a server, a client or other physical or logical processing entities. Thus, the specific structures and methods discussed in detail above are merely illustrative of a few specific embodiments of the invention.

What is claimed is:

1. A method of providing a visual presentation for a computer application, comprising the steps of:
   storing a plurality of character-based presentation definitions and a plurality of graphic-based presentation definitions in at least one data memory;
   generating a message requesting a visual presentation, said message including an identifier associated with a presentation definition;
   identifying whether a client is character-based or graphic-based;
   associating said request for a visual presentation with a presentation type supported by the client, said presentation type identifying at least one of said character-based presentation definitions and said graphic-based presentation definitions;
   retrieving a presentation definition from said data memory according to said identifier and said presentation type; and
   processing said retrieved presentation definition to display said visual presentation on a display device.

2. A method according to claim 1 further including the step retrieving said presentation type from a table.

3. A method according to claim 1 wherein said message is a standard display request message from a host application.

4. A method according to claim 1 wherein said generating step is associated with a host application comprising at least one of a COBOL application, an RPG application, a JAVA application, a C application, a C++ application, a PASCAL application, a FORTRAN application or a PL1 application.

5. A method according to claim 1 wherein said character-based presentation definition is associated with a screen comprising at least one of a 3270 screen or a 5250 screen.

6. A method according to claim 1 wherein said graphic-based presentation definition is associated with an application comprising at least one of a JAVA application, a WINDOWS application, a VISUAL BASIC application, or an ACTIVEX application.

7. A method for providing a visual presentation for a computer application running on a mainframe computer, comprising the steps of:
   storing a plurality of character-based presentation definitions and a plurality of graphic-based presentation definitions in at least one data memory;
   generating a message on said mainframe computer requesting a visual presentation, said message including an identifier associated with a presentation definition;
   identifying whether a client is character-based ortgraphic-based;
   associating said request for a visual presentation with a presentation type supported by the client, said presentation type identifying at least one of said character-based presentation definitions and said graphic-based presentation definitions;
   retrieving a presentation definition from said data memory according to said identifier and said presentation type; and
   processing said retrieved presentation definition to display said visual presentation on a display device.

8. A method for providing a visual presentation for a computer application running on an AS/400 computer, comprising the steps of:
   storing a plurality of character-based presentation definitions and a plurality of graphic-based presentation definitions in at least one data memory;
   generating a message on said AS/400 computer requesting a visual presentation, said message including an identifier associated with a presentation definition;
   identifying whether a client is character-based or graphic-based:
   associating said request for a visual presentation with a presentation type supported by the client, said presentation type identifying at least one of said character-based presentation definitions and said graphic-based presentation definitions;
   retrieving a presentation definition from said data memory according to said identifier and said presentation type; and
   processing said retrieved presentation definition to display said visual presentation on a display device.

9. A method for providing visual presentations for computer applications, comprising the steps of:
   storing a plurality of character-based presentation definitions and a plurality of graphic-based presentation definitions in at least one data memory;
   generating a message requesting a character-based visual presentation;
   generating a message requesting a graphic-based visual presentation;
   in response to said request for a character-based presentation, identifying whether a client for said character-based visual presentation is character-based or graphic-based and retrieving a first presentation definition comprising at least one of said character-based presentation definitions and said graphic-based presentation definitions; and
   in response to said request for a graphic-based presentation, identifying whether a client for said graphic-based visual presentation is character-based or graphic-based and retrieving a second presentation definition comprising at least one of said character-based presentation definitions and said graphic-based presentation definitions; and
   processing said retrieved presentation definitions to display said visual presentations on at least one display device.

10. A method for providing a visual presentation for a host application, comprising the steps of:
    storing a plurality of graphic presentation definitions in a data memory;
    executing a first host application, comprising the step of generating a host message that requests a presentation associated with one of said definitions, said host message including an identifier associated with said one definition;

executing a server application, comprising the steps of,
identifying whether a client is character-based or graphic-based;
retrieving said one definition from said data memory according to an identifier associated with said one definition and sending said one definition to a client application;
and executing a client application, comprising the steps of generating said visual presentation according to said one definition and displaying said presentation on a display device.

11. A method according to claim 10 wherein said host message comprises a first host application interface message, said method further comprising the steps of executing a second host application comprising the steps of:
receiving said first host application interface message from said first host application; and
generating a server application interface message, said server application interface message including an identifier associated with said one definition.

12. A method according to claim 10 wherein said graphic definition defines a window.

13. A method according to claim 10 wherein said first host application comprises at least one of a COBOL application, an RPG application, a JAVA application, a C application, a C++ application, a PASCAL application, a FORTRAN application or a PL/1 application.

14. A method according to claim 10 wherein said client application comprises at least one of a JAVA client application, a WINDOWS application, a VISUAL BASIC application, or an ACTIVEX application.

15. A method according to claim 10 wherein said first and second host applications are executed on a host processor and said server application is executed on a server processor.

16. A method according to claim 10 wherein said first and second host applications and at least a portion of said server application are executed on a host processor.

17. A method according to claim 10 wherein said client application and at least a portion of said server application are executed on a client processor.

18. A method according to claim 10 further comprising the steps of:
generating a request to present a screen, said request including a screen identifier;
mapping said screen identifier to a second one of said graphic definitions; and
displaying said second one definition in response to said screen request.

19. A method according to claim 18 wherein said screen comprises at least one of a 3270 screen or 5250 screen.

20. A system for providing a visual presentation for a host application, comprising:
a data memory for storing a plurality of graphic definitions;
a host processor for executing at least one application program, said at least one application program generating a request to generate a graphic-based presentation, said request including a graphic definition identifier;
said host processor including a host application interface adapted to receive said request, said host application interface for generating a message for requesting said presentation, said message including a graphic definition identifier;
a server processor, adapted to receive said message, said server processor for identifying whether a client is graphic-based or character-based, for retrieving a graphic definition from said data memory according to a graphic definition identifier and for sending said graphic definition to a client application; and
a client application processor for processing said graphic definition to display said visual presentation on a display device.

21. A system according to claim 20 wherein said at least one application program comprises at least one of a COBOL application, an RPG application, a JAVA application, a C application, a C++ application, a PASCAL application, a FORTRAN application or a PL/1 application.

22. A system according to claim 20 wherein said client application processor executes an application including at least one of a JAVA application, a WINDOWS application, a VISUAL BASIC application, or an ACTIVEX application.

23. A system according to claim 20 wherein said host processor comprises at least one of a mainframe computer or an AS/400 computer.

24. A method for providing a visual presentation for a host application, comprising the steps of:
storing a plurality of graphic definitions in a data memory;
generating a request to display a "visual presentation, said request" including an identifier identifying that a client is graphic-based;
associating said identifier with one of said graphic definitions supported by said client without associating a screen definition with a graphic definition;
retrieving said one graphic definition from said data memory; and
processing said retrieved graphic definition to display said visual presentation on a display device.

25. A method according to claim 24 further including the step of generating said graphic definitions by directly associating said definitions with at least one host application by not generating a screen definition.

26. A method according to claim 24 wherein said request is a conventional display protocol message from a host application.

27. A method according to claim 24 wherein said generating step is associated with a host application comprising at least one of a COBOL application, an RPG application, a JAVA application, a C application, a C++ application, a PASCAL application, a FORTRAN application or a PL1 application.

28. A method according to claim 24 wherein said screen definition is associated with at least one of a 3270 screen or a 5250 screen.

29. A method according to claim 24 wherein said graphic definition is associated with an application comprising at least one of a JAVA application, a WINDOWS application, a VISUAL BASIC application, or an ACTIVEX application.

30. A system for providing a visual presentation for a computer application, said system for processing a message generated by at least one application program executing on a host processor, wherein said message requests a visual presentation and includes an identifier,associated with a presentation definition, said system comprising:
a data memory for storing a plurality of character-based presentation definitions and a plurality of graphic-based presentation definitions;
a client identifier for determining a presentation type supported by a client associated with said message and for identifying whether said client is character-based or graphic-based;
a display manager for routing said message to a screen processor or a graphic processor according to said presentation type;

a screen processor for retrieving a screen definition from said data memory according to said identifier and for sending said screen definition to a client application;

and a window processor for retrieving a graphic definition from said data memory according to a graphic definition identifier and for sending said graphic definition to a client application.

31. A system according to claim 30 further comprising said host processor.

32. A system according to claim 30 further comprising a graphic-based client for processing said graphic definition to display said visual presentation on a display device.

33. A system according to claim 30 further comprising a screen-based client for processing said screen definition to display said visual presentation on a display device.

34. A method for providing a visual presentation for a host application, comprising the steps of:

storing a plurality of graphic presentation definitions in a data memory;

executing a first host application to generate a request to present one of said definitions associated with a client;

generating a host application interface message in response to said request, said host application interface message including an identifier associated with said one definition;

executing a second host application for receiving said host application interface message, for identifying whether the client is character-based or graphic based, and, when the client is graphic-based, for generating a graphic presentation message, said graphic presentation message including an identifier associated with said one definition;

executing a computer application, comprising the steps of retrieving said one definition from said data memory according to an identifier associated with said one definition and sending said one definition to a client application; and executing a client application, comprising the steps of generating said visual presentation according to said one definition and displaying said presentation on a display device.

35. A method according to claim 34 wherein said host application interface message comprises at least one of an EXFMT message or a SHOWSCR message.

* * * * *